United States Patent
Liu et al.

(10) Patent No.: US 9,954,365 B2
(45) Date of Patent: Apr. 24, 2018

(54) ELECTRICITY MANAGEMENT USING MODULATED WAVEFORMS

(71) Applicant: Microsoft Technology Licensing, LLC, Redmond, WA (US)

(72) Inventors: Jie Liu, Medina, WA (US); Brian Janous, Issaquah, WA (US); Gregory Joseph McKnight, Bellevue, WA (US); Sean James, Olympia, WA (US); Ricardo Bianchini, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 14/675,030

(22) Filed: Mar. 31, 2015

(65) Prior Publication Data
US 2016/0013647 A1 Jan. 14, 2016

Related U.S. Application Data

(60) Provisional application No. 62/023,782, filed on Jul. 11, 2014.

(51) Int. Cl.
| | | |
|---|---|---|
| *G01R 11/32* | (2006.01) | |
| *H02J 3/14* | (2006.01) | |
| *H02J 3/02* | (2006.01) | |
| *H02J 3/32* | (2006.01) | |
| *H02J 13/00* | (2006.01) | |

(52) U.S. Cl.
CPC .................... *H02J 3/14* (2013.01); *H02J 3/02* (2013.01); *H02J 3/32* (2013.01); *H02J 13/002* (2013.01);
(Continued)

(58) Field of Classification Search
CPC .... G01R 21/00; G01R 21/127; G01R 21/133; H02J 3/02; H02J 3/14; H02J 3/32
See application file for complete search history.

(56) References Cited

U.S. PATENT DOCUMENTS

| | | |
|---|---|---|
| 4,857,759 A | 8/1989 | Murphy |
| 6,644,247 B2 | 11/2003 | Campion |

(Continued)

FOREIGN PATENT DOCUMENTS

| | | |
|---|---|---|
| DE | 102009007795 A1 | 7/2010 |
| GB | 2202973 A | 10/1988 |

(Continued)

OTHER PUBLICATIONS

Haque et al., "Providing Green SLAs in High Performance Computing Clouds", Proceedings of the Sustainable Computing and Comuting for Sustainability International Green Computing Conference, Jun. 27, 2013, 11 pages.

(Continued)

*Primary Examiner* — Minh N Tang
(74) *Attorney, Agent, or Firm* — Rainier Patents, P.S.

(57) ABSTRACT

This document relates to electricity management using modulated waveforms. One example modulates electricity to obtain modulated electricity having at least two different alternating current frequencies including a first alternating current frequency and a second alternating current frequency. The example delivers the modulated electrical power having the at least two different alternating current frequencies to multiple different electrical devices, including a first electrical device configured to utilize the first alternating current frequency and a second electrical device configured to utilize the second alternating current frequency. The modulated electricity can be delivered at least partly over an electrical line shared by the first electrical device and the second electrical device.

21 Claims, 10 Drawing Sheets

(52) U.S. Cl.
CPC ..... *H02J 13/0048* (2013.01); *H02J 2003/143* (2013.01); *Y02B 70/3225* (2013.01); *Y02B 70/3266* (2013.01); *Y02B 90/222* (2013.01); *Y02B 90/2615* (2013.01); *Y02E 60/783* (2013.01); *Y04S 20/12* (2013.01); *Y04S 20/222* (2013.01); *Y04S 20/242* (2013.01); *Y04S 40/121* (2013.01); *Y04S 40/123* (2013.01)

(56) References Cited

U.S. PATENT DOCUMENTS

| | | | |
|---|---|---|---|
| 6,812,811 B2 * | 11/2004 | Robison | H02J 3/02 333/175 |
| 7,135,956 B2 | 11/2006 | Bartone et al. | |
| 7,149,605 B2 | 12/2006 | Chassin et al. | |
| 8,258,761 B2 | 9/2012 | Hammerstrom | |
| 8,364,322 B2 | 1/2013 | Oury et al. | |
| 2002/0140400 A1 | 10/2002 | Hatori | |
| 2003/0214366 A1 | 11/2003 | Robison et al. | |
| 2012/0086286 A1 | 4/2012 | Raabe | |
| 2013/0274945 A1 | 10/2013 | Ganu et al. | |

FOREIGN PATENT DOCUMENTS

| | | | |
|---|---|---|---|
| WO | 2006108892 A1 | 10/2006 | |
| WO | 2011033352 A1 | 3/2011 | |

OTHER PUBLICATIONS

U.S. Appl. No. 62/023,782 titled "Grid Energy Routing" filed Jul. 11, 2014 by Inventors Liu Jie, Brian Janous, Gregory Joseph McKnight, Sean James and Ricardo Bianchini, 32 pages.

International Preliminary Report on Patentability dated Jul. 21, 2016 from PCT Patent Application No. PCT/US2015/039464, 7 pages.

Chen, et al., "Dynamic Server Power Capping for Enabling Data Center Participation in Power Markets", In the IEEE/ACM International Conference on Computer-Aided Design, Nov. 18, 2013, 8 pages.

"Server Power Management Comparison: Dell Openmanage Power Center and HP Insight Control", Retrieved on: Aug. 6, 2014 Available at: http://en.community.dell.com/cfs-file.ashx/_key/telligent-evolution-components-attachments/13-4491-00-00-20-22-78-75/Dell-Open-Manage-Power-Center-vs-HP-Insight-Control.pdf.

"HP Power Capping and HP Dynamic Power Capping for ProLiant servers", Retrieved on: Aug. 6, 2014 Available at: http://h20565.www2.hp.com/portal/site/hpsc/template.BINARYPORTLET/public/kb/docDisplay/resource.process/?spf_p.tpst=kbDocDisplay_ws_Bl&spf_p.rid_kbDocDisplay=docDisplayResURL&javax.portlet.begCacheTok=com.vignette.cachetoken&spf_p.rst_kbDocDisplay=wsrp-resourceState%3DdocId%253Demr_na-c01549455-5%.

International Search Report and Written Opinion dated Jan. 13, 2016 from PCT Patent Application No. PCT/US2015/039464, 16 pages.

Response and Demand filed Apr. 21, 2016 to the International Search Report and Written Opinion dated Jan. 13, 2016 from PCT Patent Application No. PCT/US2015/039464, 17 pages.

Communication pursuant to Rules 161(1) and 162 EPC dated Feb. 17, 2017 from European Patent Application No. 15739733.2, 2 pages.

Response filed Jul. 21, 2017 to the Communication pursuant to Rules 161(1) and 162 EPC dated Feb. 17, 2017 from European Patent Application No. 15739733.2, 7 pages.

* cited by examiner

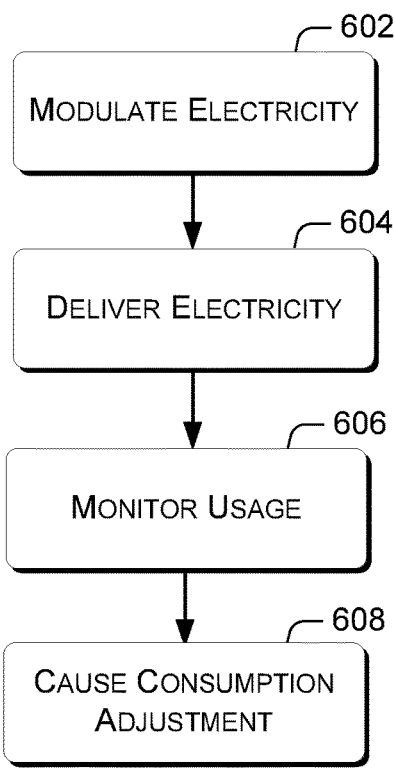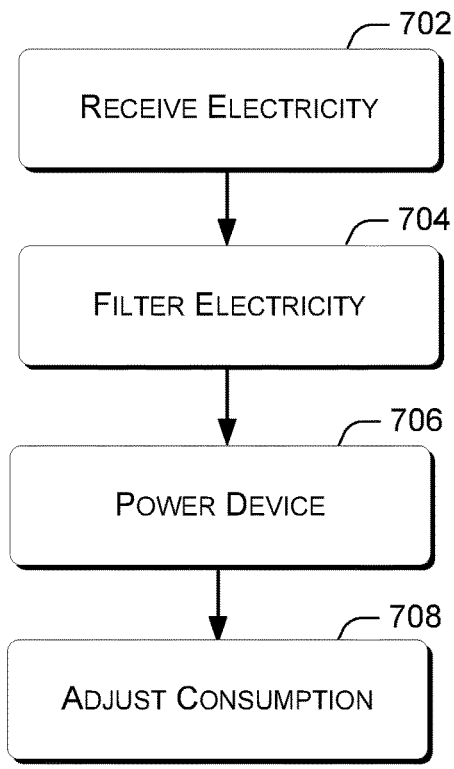
FIG. 6
FIG. 7

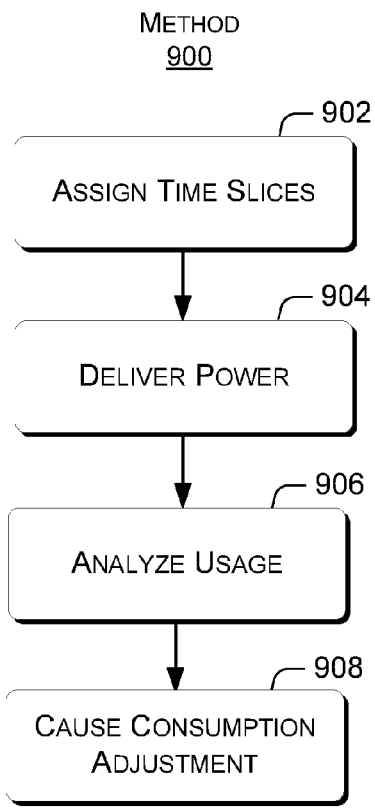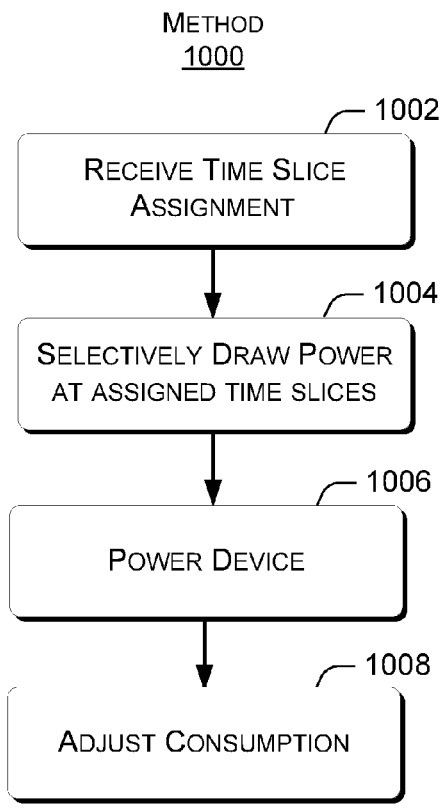
FIG. 9
FIG. 10

ELECTRICITY MANAGEMENT USING MODULATED WAVEFORMS

PRIORITY

This application is a utility application that claims priority from provisional application 62/023,782 filed Jul. 11, 2014, which is incorporated by reference in its entirety.

BACKGROUND

Typically, electricity provided to energy consuming devices is fungible, e.g., different components of the electricity are indistinguishable from the perspective of the device. For example, electricity can be provided by a variety of sources, such as renewable and non-renewable sources, but one cannot readily connect to an electrical grid and distinguish between renewable and non-renewable power on the grid. Since renewable and non-renewable energy are fungible, consumers have traditionally been indifferent to how electrical energy is sourced. However, as environmental considerations have come to the forefront of energy policy, the demand for "green" or renewable energy has increased substantially. Current mechanisms for distinguishing green energy from "brown" or fossil fuel energy are typically simple accounting mechanisms, e.g., an entity might buy a given amount of renewable electrical energy to meet regulatory requirements, obtain a tax credit, etc. However, the actual electrical energy that entity draws from the grid is typically still provided by both renewable and non-renewable sources.

Another problem faced by electrical grid operators is that there is very little direct control over electrical consumers. Typically, a given electrical device can simply plug into an outlet and begin drawing power, and the grid operator has very limited mechanisms for requesting that devices stop drawing power if need be, e.g., because the grid is under-supplied. Ideally, the grid operator would have more refined mechanisms for allocating power consumption to individual power consumers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to electricity management using modulated waveforms. One example is a method or technique that includes modulating electricity to obtain modulated electricity having at least two different alternating current frequencies including a first alternating current frequency and a second alternating current frequency. The example also includes delivering the modulated electricity having the at least two different alternating current frequencies to multiple different electrical devices, including a first electrical device configured to utilize the first alternating current frequency and a second electrical device configured to utilize the second alternating current frequency. The modulated electricity can be delivered at least partly over an electrical line shared by the first electrical device and the second electrical device.

Another example is a system that includes a filter configured to receive modulated electricity having at least two different alternating current frequencies over an electrical line, the at least two different alternating current frequencies including a first alternating current frequency and a second alternating current frequency. The filter can also be configured to attenuate the second alternating current frequency of the modulated electricity to obtain filtered modulated electricity that is predominantly of the first alternating current frequency. The system can also include an electricity consuming device configured to operate on the filtered modulated electricity.

Another example is a method or technique that includes delivering electricity to a plurality of electrical devices having assigned time slices for drawing the electricity. The example also includes analyzing usage of the electricity to detect that an individual electrical device has drawn electricity during an individual time slice that is not assigned to the individual electrical device.

Another example is a system that includes electrical hardware and an electricity consuming device. The electrical hardware can be configured to selectively draw electricity during assigned time periods and power the electricity consuming device using the electricity that is selectively drawn during the assigned time periods

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 2, 6, 7, 9, and 10 illustrate example methods or techniques consistent with some implementations of the present concepts.

DETAILED DESCRIPTION

Overview

The disclosed implementations track electricity using various modulated characteristics of the electricity. For example, some implementations may modulate different alternating current frequencies for different types of electricity, e.g., 50 Hz for "green" or renewably-sourced power and 60 Hz for "brown" or fossil fuel sourced power. Other implementations may provide different assigned time slices during which different electrical devices are permitted to draw power. When the electrical devices draw power, this will modulate the electrical waveform by reducing the amount of power on a given electrical line. As used in this document, the term "modulated characteristic" can convey any characteristic of electrical power that can be manipulated. Examples of modulated characteristics that can be measured include alternating current frequency, power, voltage, current, power factor, signals encoded using electrical waveforms, etc.

The various electrical devices discussed herein include both end user devices as well as various electrical equipment used to deliver electricity to the end user devices. For the purposes of this document, the term "electricity consuming device" refers to individual end user devices that draw power from various electrical sources. The term "electricity consumer" can refer more generally to a group of one or more electricity consuming devices, e.g., within a building, region, on a particular grid, powered by a particular transformer, etc. The term "electrical equipment" refers to other devices, such as switches, transformers, filters, etc., along circuits used to deliver power to the consuming devices. Note that electrical equipment may also draw power from these circuits. The term "electrical device" encompasses both electrical equipment and consuming devices.

Example Scenario

Figure 1:
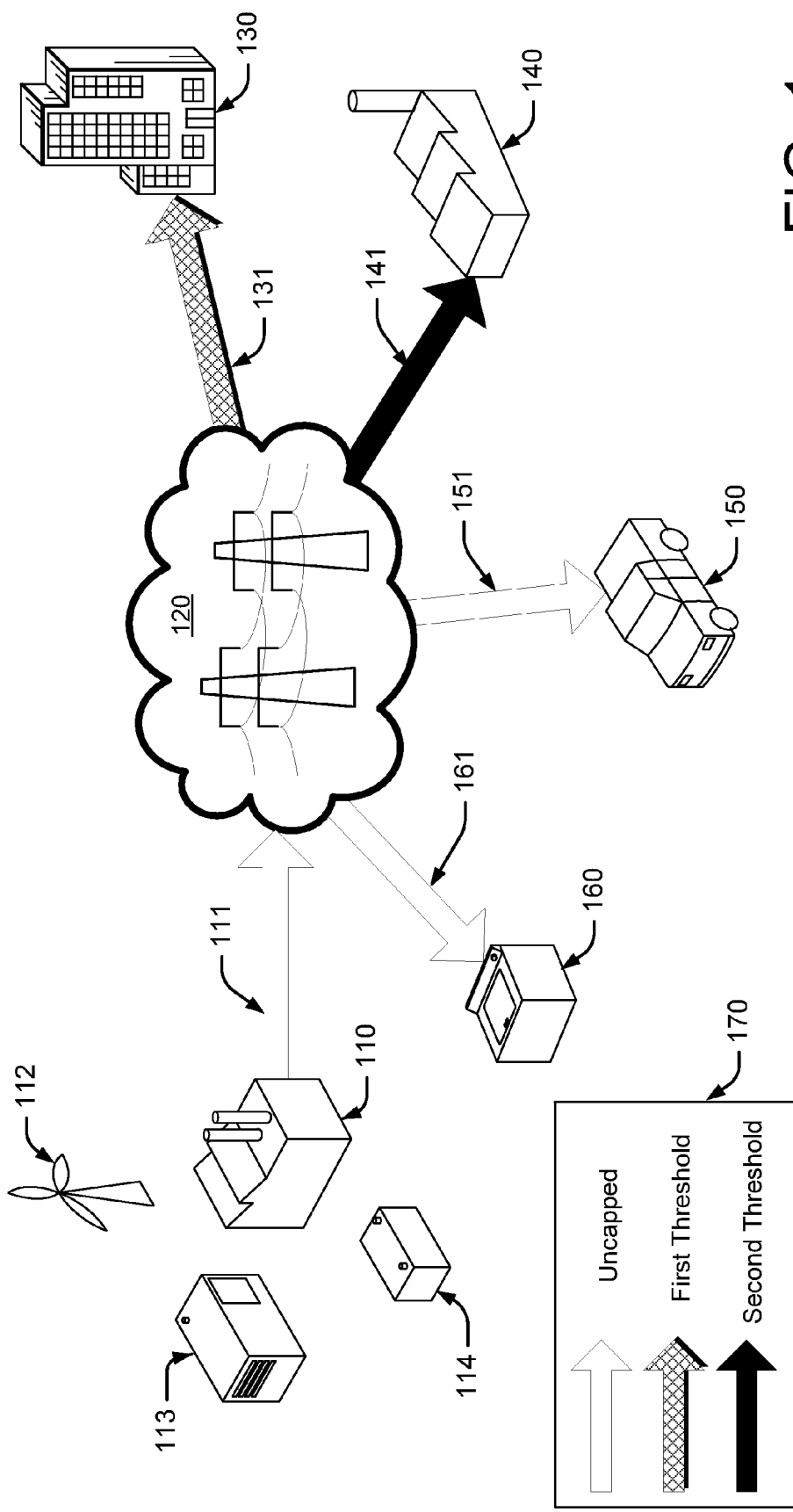
FIG. 1 illustrates an exemplary scenario consistent with some implementations of the present concepts.

Generally speaking, one scenario where the disclosed implementations can be performed is on an electrical grid. FIG. 1 illustrates an exemplary scenario 100 with a power generation facility 110 providing electrical power to an electrical grid 120 having electricity consumers 130, 140, 150, and 160. In the example of FIG. 1, the electricity consumers are shown as a server installation 130, factory 140, electric car 150, and washing machine 160, but those skilled in the art will recognize that any number of different electrically-powered devices may be connected to grid 120. Generally speaking, the power generation facility provides power to the grid and the electricity consumers consume the power, as illustrated by arrows 111, 131, 141, 151, and 161, respectively. Note that, in some cases, different entities may manage the power generation facility and the grid (e.g., a power generation facility operator and a grid operator) and in other cases the same entity will manage both the power generation facility and the grid.

In this example, the power generation facility is shown with corresponding energy sources 112, 113, and 114. Specifically, the illustrated energy sources include renewable energy sources 112 (e.g., wind, solar, hydroelectric), generators 113 (e.g., powered by fossil fuel), and energy storage devices 114 (e.g., batteries). Note that the power generation facility may also have other energy sources not shown (e.g., nuclear, fuel cells, etc.).

As mentioned, electricity is typically viewed as a fungible resource, e.g., electrical power provided to one electricity consumer can just as readily be used by a different electricity consumer. Thus, traditional techniques for providing electricity may not draw a distinction between different electricity consumers or different power sources. In some disclosed implementations, modulated characteristics of electricity are used to facilitate monitoring and controlling how the electricity is consumed by various electricity consumers. In some cases, different modulated characteristics of electricity are assigned to different sources of electrical power. In other cases, different modulated characteristics of electricity are assigned to different electricity consumers.

One type of control that can be performed on grid 120 is power or energy usage capping. FIG. 1 includes an offset 170 that shows different capping schemes represented by different types of arrows, e.g., uncapped electricity is shown in white, electricity capped to a first threshold is shown as a checked pattern, and electricity capped to a second threshold is shown in black.

Now, assume that ordinary households are permitted to use unlimited amounts of electricity, e.g., represented as electricity consumers 150 and 160. FIG. 1 illustrates this via white arrows 151 and 161. Further, assume that the electricity consumed by server facility consumer 130 is constrained to a first power consumption rate (e.g., in kilowatts) or total amount of energy for a given amount of time (e.g., fixed number of kilowatt-hours per day). FIG. 1 illustrates this via checked arrow 131, which represents electricity capped to a first threshold. Likewise, assume that electricity consumed by factory consumer 140 is capped to a second power consumption rate or energy amount. FIG. 1 illustrates this via black arrow 141, which represents electricity capped to a second threshold.

Generally, the disclosed implementations can enforce the first and second thresholds using certain modulated characteristics of the electricity used by the various consumers. For example, household consumers 150 and 160 may receive power modulated to a first frequency (e.g., 60 hertz) where the grid 120 (and/or associated power generation facility 110) is configured so that the electricity provided at the first frequency is not capped. Server installation 130 may receive power modulated to a second frequency (e.g., 70 hertz) and the grid/power generation facility may be configured to cap the electricity that is provided at 70 hertz. For example, the server installation and utility (grid or power plant operator) may have agreed in advance that server installation 130 is limited to a certain power consumption rate or cumulative amount of energy consumption. Likewise, factory 140 may receive power at a third frequency (e.g., 50 hertz) where the electricity is capped to a different power consumption rate or cumulative amount of energy consumption.

In further implementations, the capping on each frequency is not necessarily static. Rather, the grid and/or power generation facility can be configured to vary the amount of power provided on the different frequencies in response to different conditions. For example, the amount of power provided at the third frequency to the factory 140 can be reduced in response to a shortage of power on the grid, while prioritizing power provided to household consumers 150 and 160 and server installation 130. If conditions worsen and the power deficit on the grid becomes more critical, the amount of power provided on the second frequency to the server installation can be reduced while maintaining uncapped power for household consumers. Further implementations may maintain a dedicated uncapped (or prioritized) frequency for emergency services such as hospitals, 911 dispatch, police, fire departments, military, etc., that can be kept at a high level of service even when electricity usage is capped for household consumers.

In some implementations, the various consumers will have electrical hardware that is specifically configured according to the modulated characteristics of the electricity. For example, the household consumers 150 and 160 may have electrical hardware that draws power at 60 hertz, the server installation 130 may have electrical hardware that draws power at 70 hertz, and the factory 140 may have electrical hardware that draws power at 50 hertz. As discussed more below, the electrical hardware can include rectifiers that are tuned to the corresponding frequency and convert the power to DC voltage (e.g., for powering servers in the server facility). In other cases, filters, transformers or other electrical equipment can be tuned to draw power from specific frequencies.

In further implementations, electricity can be modulated to maintain separate sources of power for various reasons. In one case, renewably-sourced "green" power from renewable energy source 112 (wind, solar, hydroelectric, etc.) is provided at a first frequency and "brown" power from fossil fuel generators 113 is provided at a second frequency. In addition, different rates can be established for the different types of power. One specific instance where this can be useful is when regulatory requirements dictate that certain consumers (e.g., in certain jurisdictions) use renewable power. By modulating green power at a different frequency than brown power, a remote grid many miles away from these consumers can send green power to the local grid. Thus, as long as those consumers are using electrical equipment configured to draw power at the correct frequency, they can comply with the regulatory requirements irrespective of whether their local grid is also providing brown power to other consumers.

Power Management Method

Figure 2:
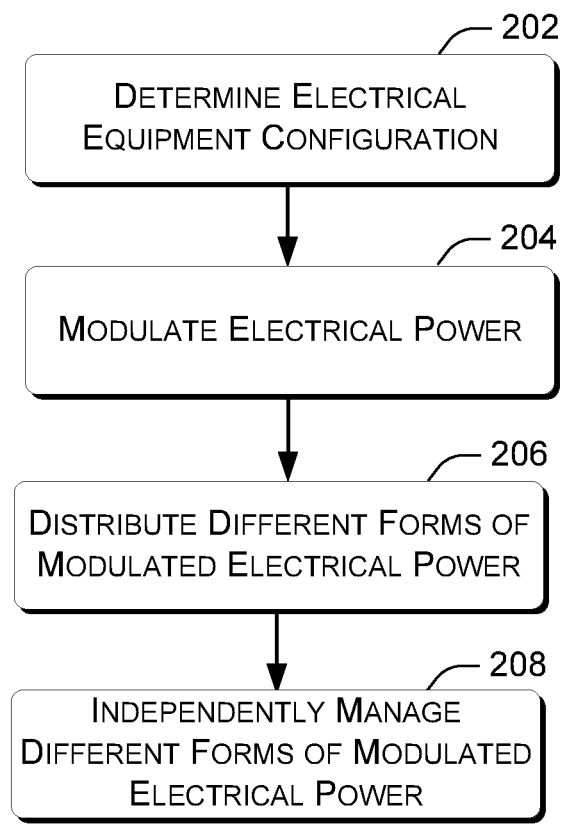

FIG. 2 shows a method 200 that can be performed by various systems in accordance with the above scenario. For example, method 200 can be performed on grid 120, inside a given building, on a university campus, within an individual device, etc.

Block 202 of method 200 can determine electrical equipment configurations for various electrical consumers. For example, the electrical equipment configurations can correspond to various characteristics of electricity that can be modulated. One such characteristic is frequency, in hertz, of alternating current. In some cases, one consumer will have electrical devices configured to draw electricity having a first characteristic and another consumer will have electrical devices configured to draw electricity having a second characteristic.

Block 204 can modulate electricity into different forms as appropriate for the electrical devices. For example, block 204 can modulate electricity into two or more different alternating current frequencies.

Block 206 can distribute the modulated forms of electricity. For example, the electricity at the first frequency can be distributed to a first group of electricity consumers and the electricity at the second frequency can be distributed to a second group of electricity consumers.

Block 208 can independently manage the different forms of modulated electricity. For example, different modulated forms of electricity can be power or energy capped at different thresholds. As another example, different modulated forms of electricity can be charged at different rates.

In addition, for ease of exposition the aforementioned description focused largely on the use of frequency as a modulated characteristic of electricity. However, note that other characteristics of electricity can be used in an analogous fashion. For example, instead of multiplexing electricity using frequency on the same power lines to different consumers, electricity can be multiplexed using time division and/or code division techniques. For example, in a time division approach, different consumers may have electrical equipment configured to draw electricity from different time slices, perhaps mitigated by local energy storage such as batteries. In some cases, a first time slice may be used by one consumer and a second time slice may be used by another consumer. Likewise, electricity may be coded into different codes so that different consumers have electrical equipment configured to draw power having particular codes, e.g., a first code for one consumer and a second code for another consumer.

Example Network Scenario

Figure 3:
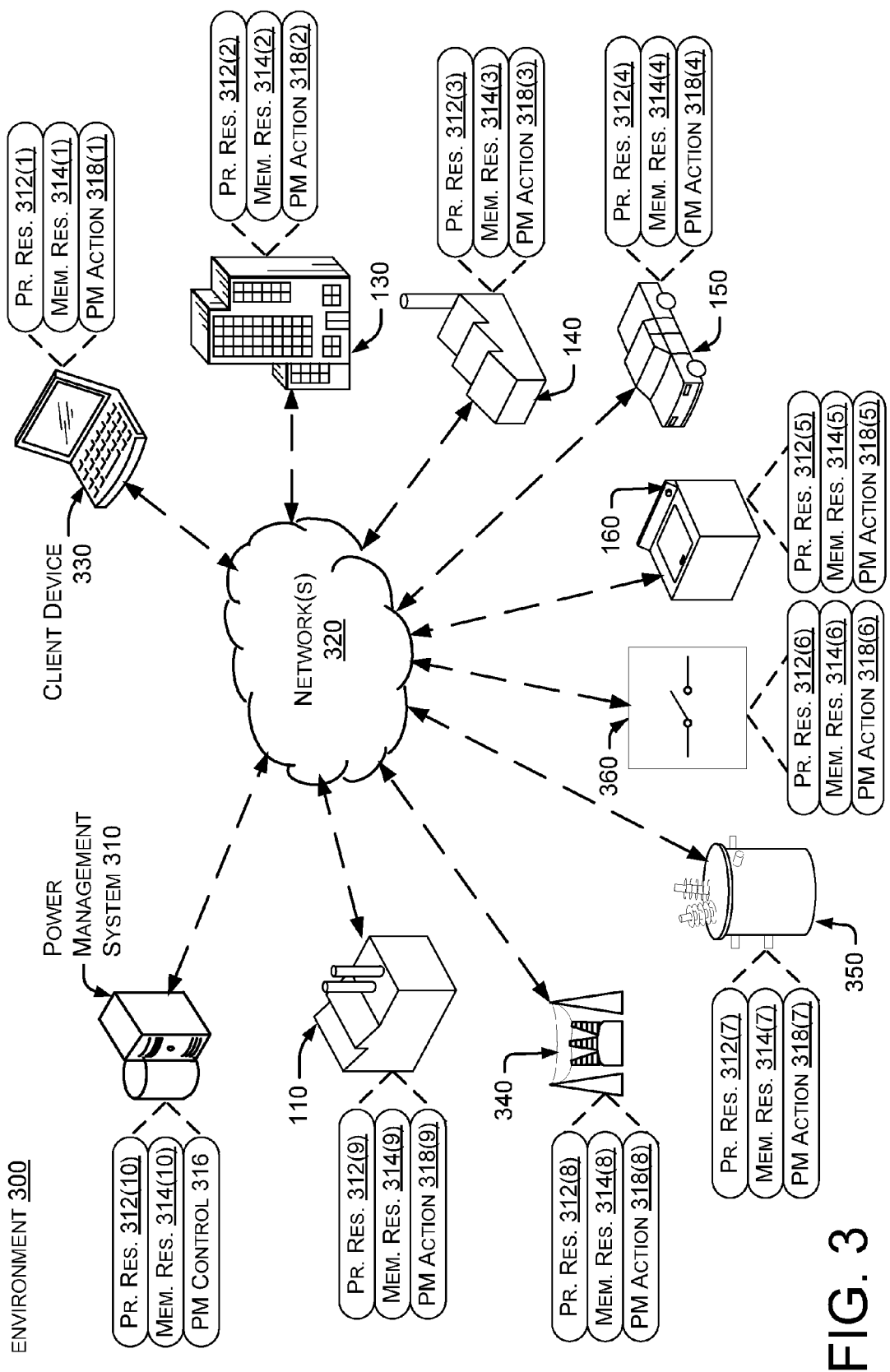
FIG. 3 illustrates an example environment consistent with some implementations of the present concepts.

One specific environment in which the disclosed techniques can be performed is shown in FIG. 3, which shows an example environment 300 including a power management system 310 connected via a network 320 to power generation facility 110 as well as electricity consumers such as server installation 130, factory 140, electrical car 150, and washing machine 160. The power generation facility may also be connected to a client device 330 and electrical equipment such as substation 340, transformer 350, and switch 360 (e.g., mechanical, transistor, etc.). Note that network 320 can be implemented using power line communication techniques and/or traditional computer networks (e.g., wired, cellular, wireless, etc.), as discussed more herein.

Generally speaking, the power management system 310 may provide power management functionality by performing any of the methods discussed herein using power management control module 316. For example, the power management system may control the amount of energy or power consumed at any given time by any of the electricity consumers. This can be implemented by communicating directly with the electricity consumers over network 320. In some implementations, each consumer can have a corresponding power management action module 318 that can operate according to instructions received from the power management system, as discussed below. (In this discussion, the use of a designator with the suffix, such as "(1)", is intended to refer to a specific instance of a device component or module. In contrast, use of the designator without a suffix is intended to be generic). Of course, not all device implementations can be illustrated and other device implementations should be apparent to the skilled artisan from the description above and below.

In some cases, the power management system 310 can communicate with electrical equipment along one or more circuits that supply the consumers. This electrical equipment can include substation 340, transformer 350, and switch 360, as well as the power generation facility 110. In some implementations, each piece of electrical equipment also has a power management action module that can operate according to instructions received from the power management system.

Alternatively or in addition, individual electricity consumers can have a collocated client device such as client device 330 that controls local electricity consuming devices and/or electrical hardware on-site. For example, a laptop or other computing device in a residence, factory, or server installation could have direct control over local electricity consuming devices and/or electrical hardware. In such implementations, the power management system can control the local electricity consuming devices and/or electrical hardware by instructing client device 330, which in turn controls the local electricity consuming devices according to the received instructions.

As noted, network 320 can be implemented using traditional wired or wireless computer networks and/or power line communication. Thus, instructions can be sent to a given piece of electrical equipment or electricity consuming device over electrical lines or over a separate computer network. Also, note that power management system, client device 330, electrical consumers, and electrical equipment can include various processing resources 312 and memory/storage resources 314. These components are discussed in more detail below in the section entitled "Computing Hardware Implementations."

Example Electrical Grid Hierarchy

As used herein, the term "electrical grid" refers to an organizational unit of electrical equipment that delivers energy to consumers within a given region. For example, electrical grids can include substations, electrical lines, transformers, power generation facilities, and many other types of electrical equipment. In some cases, the region covered by an electrical grid can be an entire country, such as the National Grid in Great Britain. Indeed, even larger regions can be considered a single grid, e.g., the proposed European super grid that would cover many different European countries. Another example of a relatively large-scale grid is various interconnections in the United States, e.g., the Western Interconnection, Eastern Interconnection, Alaska Interconnection, Texas Interconnection, etc.

Within a given grid there can exist many smaller organizational units that can also be considered as grids. For example, local utilities within a given U.S. interconnection may be responsible for maintaining/operating individual regional grids located therein. The individual regional grids within a given interconnection can be electrically connected and collectively operate at a specific alternating current frequency. Within a given regional grid there can exist even smaller grids such as "microgrids" that may provide power to individual neighborhoods.

Figure 4:
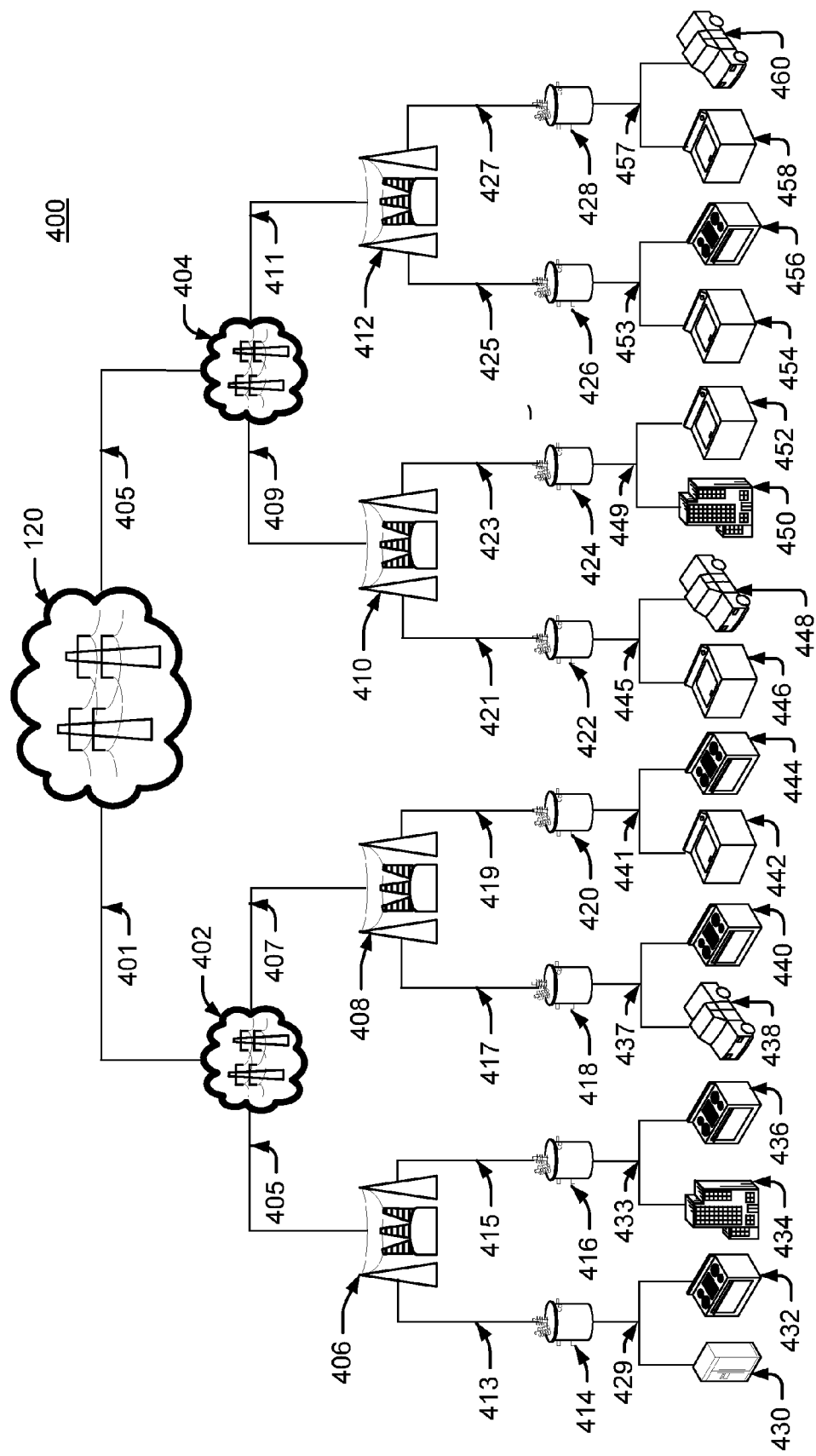
FIG. 4 illustrates an exemplary grid hierarchy consistent with some implementations of the present concepts.

FIG. 4 illustrates an exemplary electrical grid hierarchy 400 consistent with certain implementations. Note that FIG. 4 is shown for the purposes of illustration and that actual electrical grids are likely to exhibit significantly more complicated relationships than those shown in FIG. 4. Nevertheless, FIG. 4 does illustrate relationships that can occur on electrical grids, as discussed more below.

Electrical grid hierarchy 400 can be viewed as a series of layers, with a top layer having grid 120. Grid 120 can be connected to other, smaller grids such as grids 402 and 404 in a next-lower layer via electrical lines 401 and 405, respectively. Grids 402 and 404 can, in turn, include substations such as substations 406, 408, 410, and 412 in a next-lower layer which connect to grids 402 and 404 via electrical lines 405, 407, 409, and 411 as shown in FIG. 4. Each of the substations can have various transformers 414, 416, 418, 420, 422, 424, 426, and 428 in a next-lower layer, connected as shown by electrical lines 413, 415, 417, 419, 421, 423, 425, and 427. These transformers can supply electricity provided by higher levels of the hierarchy to various electrical consumers in the lowest layer, which shows electricity consumers 430, 432, 434, 436, 438, 440, 442, 444, 446, 448, 450, 452, 454, 456, 458, and 460 connected to the transformers as shown by lines 429, 433, 437, 441, 445, 449, 453, and 457.

Note that grid hierarchy 400 is intended to convey a general overall structure of grid 120 and that many variations are contemplated. Also, note that while electrical grid hierarchy 400 shows electrical relationships between the elements shown in FIG. 4, these electrical relationships can also correspond to geographical relationships. For example, grids 404 and 406 could be regional grids for two different regions and grid 120 could be an interconnect grid that includes both of these regions. As another example, grids 404 and 406 could be microgrids serving two different neighborhoods and grid 120 could be a regional grid that serves a region that includes both of these neighborhoods. More generally, grids shown at the same level of the grid hierarchy will typically be geographically remote, although there may be some overlapping areas of coverage.

Frequency Modulation Example

Figure 5:
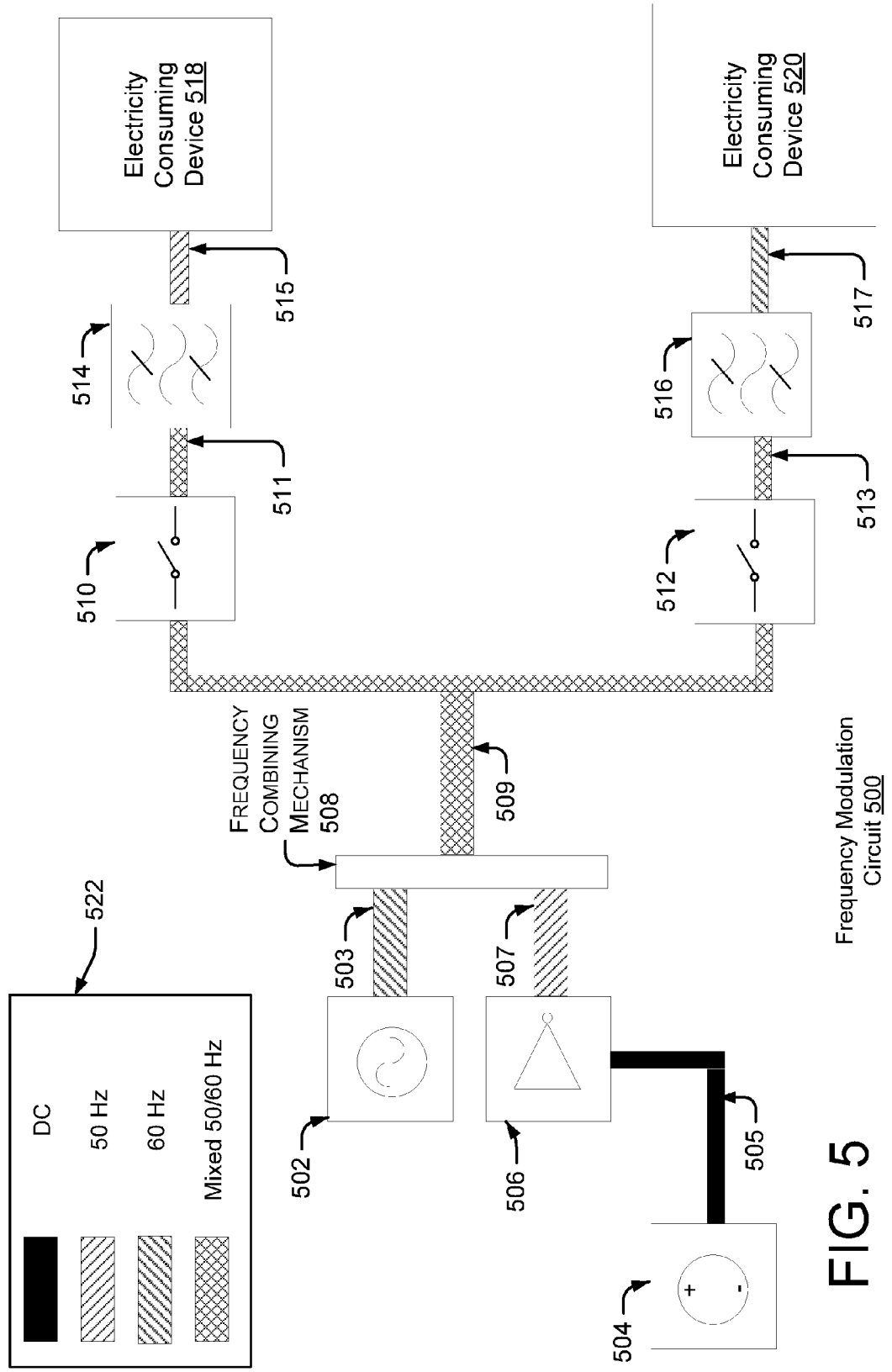
FIGS. 5 and 8 illustrate example circuits consistent with some implementations of the present concepts.

FIG. 5 shows an example frequency modulation circuit 500 that can be used to modulate different alternating current frequencies, e.g., obtained from different power sources. Circuit 500 includes an AC power source 502, DC power source 504, inverter 506, frequency combining mechanism 508, switches 510 and 512, filters 514 and 516, and electricity consuming devices 518 and 520. Generally, the electricity consuming devices 518 and 520 can be configured to run off of different alternating current frequencies, e.g., 50 Hz for electricity consuming device 518 and 60 Hz for electricity consuming device 520.

AC power source 502 can generate alternating current at a first frequency, e.g., 60 Hz, and transmit the alternating current over an electrical line 503 to the frequency combining mechanism 508. DC power source 504 can generate direct current power and transmit the direct current power over an electrical line 505 to an inverter 506. Inverter 506 can convert the direct current power to an alternating current at a different frequency, e.g., 50 Hz, and transmit the 50 Hz alternating current over an electrical line 507 to the frequency combining mechanism 508. The frequency combining mechanism can combine the 50 Hz alternating current from electrical line 507 with the 60 Hz alternating current from electrical line 503 to provide a mixed frequency alternating current over electrical line 509.

Note that FIG. 5 represents direct current as shown on electrical line 505 using black, 50 Hz alternating current as shown on electrical line 507 using a backslash pattern, 60 Hz alternating current as shown on power line 503 using a forward slash pattern, and mixed alternating current as shown on power line 509 using a crosshatched pattern. FIG. 5 includes an offset 522 that conveys these representations.

Frequency modulation circuit 500 also includes switches 510 and 512, which can be configured to turn on or off power provided to the electricity consuming devices 518 and 520, respectively. When switch 510 is closed, power flows over electrical line 511 through filter 514 to electricity consuming device 118. When switch 510 is open, power does not flow over electrical line 511 through 514 to the electricity consuming device 518. Likewise, switch 512 controls power delivery through filter 516 to electricity consuming device 520.

As noted above, electricity consuming devices 518 and 520 are configured to operate on different alternating current frequencies, e.g., 50 and 60 Hz, respectively. However, as already noted, electrical line 509 carries both frequencies and thus electrical lines 511 and 513 also carry both frequencies. Filter 514 can filter out the 60 Hz alternating current from line 511 to provide filtered 50 Hz alternating current over electrical line 515 to electricity consuming device 118. Likewise, filter 516 can filter out the 50 Hz alternating current from line 513 to provide filtered 60 Hz alternating current over electrical line 517 to electricity consuming device 520. This can prevent damage to the electricity consuming devices that could be caused by connecting these devices directly to electrical lines with the wrong alternating current frequency.

Also, note that FIG. 5 shows only one example of many different types of circuits that can be used to implement the frequency modulation techniques discussed herein. For example, some implementations may use multiple alternating current generators to directly obtain multiple alternating current frequencies (e.g., a 50 Hz and a 60 Hz generator) instead of inverting direct current to obtain individual frequencies. As another example, a single DC voltage source could be modulated into multiple frequencies using multiple inverters or different DC voltage sources could be modulated into different AC frequencies. A utility might choose to modulate DC current produced by a wind farm into 70 Hz alternating current and to modulate DC current produced by photovoltaic cells into 50 Hz alternating current, for example.

In some implementations, frequency combining mechanism 508 can simply be a junction of electrical lines 503 and 507, e.g., a splice or other mechanical connection. In further implementations, the frequency combining mechanism can include circuit components to protect equipment on electrical lines 503 and 507. For example, the frequency combining mechanism can include a filter to attenuate 50 Hz current that might feed back onto electrical line 503 to protect AC power source 502 and/or another filter to attenuate 60 Hz current that might feed back onto electrical line 507 to protect DC power source 504 and/or inverter 506. Relays, circuit breakers, fuses, and other circuit protection devices can also be used to protect the power generating equipment. In some cases, these circuit protection devices can be configured to trigger on over/under frequency conditions, and can also be used to detect reverse power conditions, overcurrent conditions, etc.

In addition, the frequency combining mechanism 508 can, in some cases, be involved in generating different frequencies that are placed onto electrical line 509. For example, the frequency combining mechanism can be implemented as a frequency mixer. For example, suppose green energy is obtained at 60 Hz. To distinguish the green energy from the brown energy, the green energy can be mixed with 10 Hz power to obtain 50 Hz and 70 Hz current before placing the green energy on electrical line 509. Thus, the green energy on electrical line 509 is at 50 and 70 Hz and distinguishable from 60 Hz brown energy, even though the green energy was originally obtained at the same frequency (60 Hz) as the brown energy.

Note that the disclosed techniques can be performed in many different scenarios and using many different techniques for modulating electricity. For example, implementations may use waveform correction circuits, motor generator systems, or other techniques to modulate electricity. In addition, some implementations may employ a microcontroller, microprocessor, ASIC, and/or FPGA to implement various actions at the frequency combining mechanism, e.g., filtering and/or throttling different frequencies as discussed elsewhere herein.

The frequency combining mechanism 508 can also include a meter to track power consumption of different frequencies. Note also that a meter configured to track usage of multiple frequencies can also be deployed anywhere in frequency modulation circuit 500 where mixed frequency alternating current is present, e.g., electrical lines 509, 511, and/or 513. Alternatively, separate meters configured to track usage of a single frequency can be deployed wherever electrical current predominantly has one frequency, e.g., electrical lines 503, 507, 515, and/or 517.

Frequency Modulation Discussion

Frequency modulation circuit 500 can be implemented on grid 120 in various different ways. In some cases, the various electrical devices shown in FIG. 5 are collocated and in other cases are geographically remote from one another. The following discussion explains this with reference to how the various components of frequency modulation circuit 500 shown in FIG. 5 can be integrated into the grid hierarchy 400 shown in FIG. 4.

In one implementation, the entire frequency modulation circuit 500 is located downstream of the local transformer. For example, transformer 414 can output 60 Hz power and serve as AC power source 502. This 60 Hz power can also be rectified by a rectifier located with the transformer to serve as DC power source 504, and then inverted by an inverter collocated with the transformer and rectifier to 50 Hz alternating current by inverter 106. In this configuration, each premises connected to the transformer can have one or more switches and filters as well as electricity consuming devices.

For example, consider a single household with a refrigerator 430 and a range 432. The range may be configured to operate on 60 Hz power and the refrigerator may be configured to operate on 50 Hz power. Thus, the range may receive power from a filter that removes the 50 Hz current and the refrigerator may receive power from another filter that removes the 60 Hz current.

Now, assume that grid conditions become unstable and outages are likely. To prevent the outages, the power management system 310 may send instructions to switches connected to 60 Hz equipment to open and thus prevent this equipment from drawing power. However, the power management system may continue to allow 50 Hz equipment to continue drawing power by letting the switches connected to 50 Hz remain closed. Under these circumstances, the homeowner might lose the ability to use their range 432, but their refrigerator 430 can continue operating to prevent food spoilage. As another example, a hospital could run largely or entirely on 50 Hz power and other "regular" energy consumers run on 60 Hz. Thus, the hospital can be insulated from outages that affect the "regular" 60 Hz consumers. In such an implementation, each building can have a corresponding filter that removes any frequencies that are not used by the equipment in the building.

In other implementations, the frequency modulation circuit 500 is spread across different levels of the grid hierarchy. For example, the renewable power source 112 (FIG. 1) of power generation facility 110 can serve as DC power source 504 in the frequency modulation circuit and be inverted to 50 Hz "green" power, and the fossil fuel generators 112 can serve as the AC power source in the frequency modulation circuit generated as 60 Hz "brown" power. The frequency combining mechanism 508 can be collocated with the power generation facility at a substation. This enables transmission of mixed frequency power from grid 120 across different layers of the grid hierarchy 400 to individual power consumers.

In these implementations, certain electrical devices can be configured to operate on green power (e.g., at 50 Hz) and other electrical devices can be configured to operate on brown power (e.g., at 60 Hz). Because the entire grid hierarchy can be used to carry both types of power, a significant amount of existing infrastructure can be reused to provide two different types of power. For example, existing transmission and distribution lines as well as facility wiring may be capable of carrying mixed frequency current as described herein. In some cases, green energy sourced at one location (e.g., assume grid 402 is in Washington state) can be transmitted over very long distances (e.g., assume grid 404 is in Maryland). This would allow a utility in Maryland to distinguish between green energy delivered from California and local brown energy because the different sources have different corresponding frequencies.

As another example, consider a first neighborhood having several buildings powered by a first transformer and a second neighborhood having several other buildings powered by a second transformer. Both neighborhoods can be geographically close to one another, e.g., both in the state of Rhode Island. Suppose 60 Hz current is transmitted over grid 120 from California to Rhode Island and Rhode Island has a local grid 402 that runs on 50 Hz current. A filter to remove the 50 Hz alternating current can be provided with the first transformer that powers the first neighborhood to run the first neighborhood on California power. A filter that removes the 60 Hz alternating current can be provided with the second transformer that powers the second neighborhood to run the second neighborhood on Rhode Island power.

On the other hand, certain equipment in existing electrical grids may not operate efficiently with mixed frequency current. One example is various transformers in the hierarchy, which tend to act as filters. For example, existing transformers in the US electrical grid may be constructed to carry 60 Hz current and may tend to attenuate 50 Hz current. In addition, certain electrical equipment may be damaged by different current frequencies. Thus, the specific implementation scenarios of frequency modulation circuit 500 can involve replacing certain existing equipment with new equipment that is capable of handling the mixed frequency current.

Frequency Modulation Providing Method

The frequency modulation circuit 500 shown in FIG. 5 is one example of a circuit that can be used to implement a frequency modulation providing method 600, shown in FIG. 6. Generally speaking, method 600 can be performed in association with providing or generating electrical power, and can be performed by an electrical utility, grid operator, etc. However, the method can also be performed by other entities and in various contexts, e.g., within a single device, within a home, within a neighborhood, over large geographic regions, etc.

Method 600 begins at block 602, where power is modulated to have two or more alternating frequency currents. Some power sources, such as fossil fuel generators, typically generate alternating current and the frequency of alternating current used by these power sources can be used directly in the generated power. Other power sources, such as many renewable sources (photovoltaic, hydropower, wind power, etc.) generate direct current. The direct current from these sources can be converted to alternating current, e.g., using an inverter as shown above.

Method 600 continues at block 604, where the multi-frequency alternating current is delivered to one or more electrical devices. For example, the multi-frequency alternating current can be delivered over an electrical line "shared" by two different electrical devices. For the purpose of this document, the term "shared electrical line" means any electrical line used to provide power to at least two different electrical devices (e.g., electrical line 509 in FIG. 5). Note that some implementations may also include electrical lines that predominantly include a particular frequency of alternating current (e.g., electrical lines 515 and 517 in FIG. 5 after filtering by filters 514 and 516).

Method 600 continues at block 606, where usage of the multi-frequency electricity is monitored. For example, in some cases, the different alternate frequency currencies are monitored separately. For example, 60 Hz current can be monitored separately from 50 Hz current. In some cases, different capping and pricing mechanisms can also be applied to the different frequencies, as discussed elsewhere herein.

Method 600 continues at block 608, which causes an adjustment to usage of the electricity. For example, referring back to FIG. 5, the power consumption by electricity consuming device 518 can be adjusted by sending an instruction to reduce, stop, or increase the amount of power drawn by this electricity consuming device. In some cases, the instructions are sent directly to the electricity consuming device, and in other cases can be sent to another device in the circuit such as switch 510. In some cases, the instruction is sent over a computer network, and in other cases power line communication techniques are used to send the instruction over one or more of the electrical lines.

Generally, the aforementioned method allows for selectively monitoring and controlling different types of power using different alternating current frequencies. As noted above, some implementations may use one frequency (e.g., 60 Hz) for "brown" or non-renewable power and another frequency (e.g., 50 Hz) for "green" or renewably sourced power. However, other variations are also contemplated. For example, electricity provided by one utility (e.g., in a first geographic location) can be provided at one frequency and electricity provided by a different utility (e.g., in a second geographic location remote from the first location) can be provided at another frequency. As another example, energy charged at a first rate can be provided on a different frequency charged at a second rate.

Also, note that filtering of a given frequency may not necessarily remove all of that frequency from a given electrical line. Generally, a device configured to operate on a first frequency may tolerate receiving a certain amount of other frequencies as well. For the purposes of this document, a filter may be described as providing alternating current of "predominantly" a specific frequency. This means that other frequencies have been removed from the modulated electricity to a sufficient extent that electricity consuming devices configured to operate on the specific frequency can do so relatively safely, e.g., that other frequencies remaining after the filtering are unlikely to cause damage.

Similarly, mixed frequency alternating current may have various frequencies included therein that are not necessarily intended or used for powering electricity consuming devices. For example, an electrical line carrying 50 Hz and 60 Hz current may carry harmonics, noise, and/or spurious signals and thus may have various frequency components other than the 50 Hz and 60 Hz alternating current. For the purposes of this document, an electrical line that "predominantly" carries mixed frequency alternating current means that the mixed frequency alternating current can be separated (e.g., by filtering) into at least two distinct frequency components and each distinct frequency component can be used for powering one or more electrical devices on a continuous or intermittent basis. An electrical line predominantly carrying a single frequency or multiple frequencies of alternating current may nevertheless include other frequency components such as the aforementioned harmonics, spurious signals, and/or noise.

Frequency Modulation Consumption Method

The frequency modulation circuit 500 shown in FIG. 5 is also an example of a circuit that can be used to implement a frequency modulation consumption method 700, shown in FIG. 7. Generally speaking, method 700 can be performed in association with consuming electrical power, and can be performed by an electricity consuming device or by electrical equipment collocated with the electricity consuming device. In some cases, the method is performed by equipment provided by a utility or grid operator to individual consumers, although other implementations are also contemplated and discussed further herein.

Method 700 begins at block 702, where electricity including mixed frequency alternating current is received. As noted, the mixed frequency alternating current can be received over a single electrical line.

Method 700 continues at block 704, where the electricity having the mixed frequency alternating current is filtered to provide filtered electrical power. For example, the mixed frequency alternating current can be filtered to provide alternating current that predominantly contains a first alternating current frequency by attenuating or removing a second alternating current frequency.

Method 700 continues at block 706, where an electrical device is powered with the filtered electrical power. For example, the electrical device can be a device configured to run on the first alternating current frequency.

Method 700 continues at block 708, where power or energy consumption by the electrical device is adjusted. For example, an instruction to reduce, halt, or increase consumption of electrical power can be received. In some cases, the instruction is received by the electrical device being powered (e.g., electricity consuming device 518), and in other cases, can be received by another device such as switch 510.

Generally, method 700 can serve as a counterpart to method 600. For example, assume renewable energy sources are provided at 50 Hz and fossil fuel sources are provided at 60 Hz. Further assume renewable sources are strained, e.g., due to excessive demand, weather conditions that limit renewable energy generation (e.g., cloud cover), etc. Instructions can be sent to disable electricity consuming devices that draw from the 50 Hz source of electricity while continuing to allow the 60 Hz electricity consuming devices to run.

Also note that method 700 can be performed for multiple devices. For example, block 704 can include filtering the mixed frequency alternating current using two different filters. A first filter can provide alternating current that predominantly contains a first alternating current frequency by attenuating or removing a second alternating current frequency, and the second filter can provide alternating current that predominantly contains the second alternating current frequency by attenuating or removing the first alternating current frequency. Block 706 can include powering the first and second devices with different electrical lines having corresponding filtered alternating frequency current. Said differently, the electricity received by the filters is predominantly mixed alternating frequency current and the electricity received by the power consuming devices is predominantly of the correct alternating frequency current on which those devices are configured to operate.

Also, note that electrical devices other than switches can be used to adjust consumption of electrical energy for a given frequency. For example, selectable filter arrangements can be deployed within grid hierarchy 400. For example, a filter to remove 50 Hz current can be activated anywhere within the grid hierarchy when 50 Hz current is strained by sending an appropriate instruction to the filter. For example, the filter could be placed at substation 406 to stop electricity consumers 430, 432, 434, and 436 from drawing 50 Hz current while continuing to allow the other consumers to do so. As another example, the filter could be placed at transformer 414 and activated to prevent consumers 430 and 432 from drawing 50 Hz current while allowing consumers 434 and 436 to continue doing so.

Frequency Waveform Characteristics

Generally, multiple alternating frequencies can be transmitted over a given electrical line by summing the individual waveforms. In an extreme case, an impulse or square wave signal having a multitude of different frequency components can be placed on an electrical line and appropriate filters used to extract these frequency components on the consumption side.

The specific filters used can depend on how different frequencies are used. For example, in the case where there are only two frequencies on a given line, a high pass filter (e.g., filtering out frequencies below 55 Hz) could be used for a 60 Hz device and a low pass filter (e.g., filtering out frequencies above 55 Hz) could be used for a 50 Hz device. In further implementations, bandpass filters can be used, e.g., a 50 Hz device could have a 49-51 Hz bandpass filter to run on 50 Hz current, a 55 Hz device could have a 54-56 Hz bandpass filter to run on 55 Hz current, and a 60 Hz device could have a 59-61 Hz bandpass filter to run on 60 Hz current, all sharing a given electrical circuit.

Temporal Modulation Example

Figure 8:
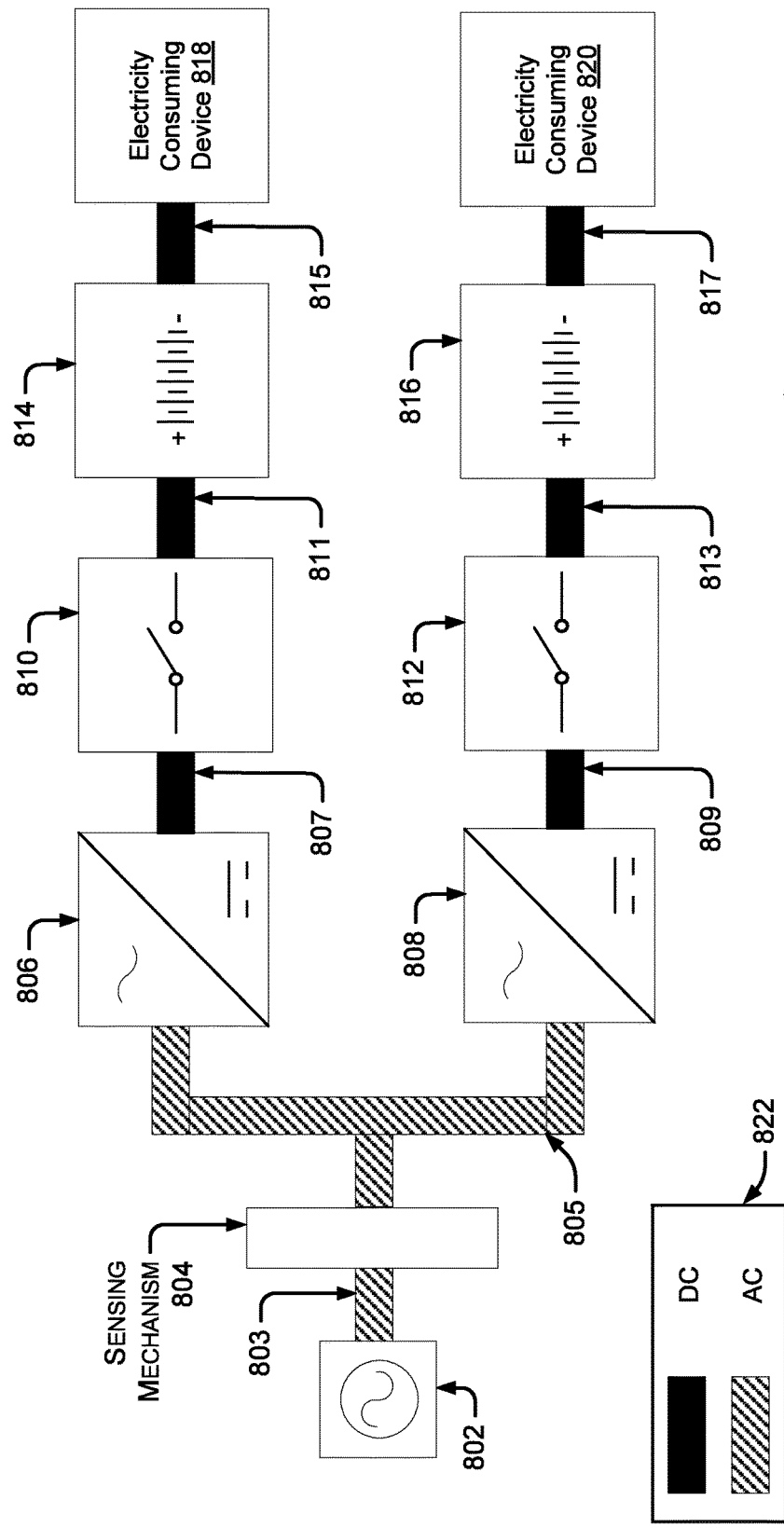

FIG. 8 shows an example temporal modulation circuit 800 that can be used for temporal modulation of electrical power. Circuit 800 includes an AC power source 802, sensing mechanism 804, rectifiers 806 and 808, switches 810 and 812, energy storage 814 and 816, and electricity consuming devices 818 and 820. Generally, the electricity consuming devices 818 and 820 can have different assigned time slices from which to draw power produced by the AC power source 802. The sensing mechanism 804 can be used to detect whether the electricity consuming devices have drawn power from the correct time slices or have improperly drawn power from unassigned time slices. For example, the sensing mechanism can be an integrated circuit that senses voltage, frequency, and/or power and digitize the sensed values for analysis by the power management system 310.

The AC power source 802 can generate alternating current power at a given frequency, e.g., 50 or 60 Hz as discussed above. The alternating current power can be carried via electrical lines 803 and 805 to rectifiers 806 and 808, respectively. Rectifier 806 can convert the alternating current to direct current and provide the direct current to switch 810 via electrical line 807. Likewise, rectifier 808 can convert the alternating current to direct current and provide the direct current to switch 812 via electrical line 809. As shown in offset 822, direct current is represented in FIG. 8 in black and alternating current is represented in FIG. 8 as a forward slash pattern.

Switches 810 and 812 can operate similarly to switches 510 and 512 discussed above with respect to FIG. 5. When switch 810 is closed, the direct current produced by rectifier 806 can be used to charge energy storage 814, and when this switch is open the energy storage 814 is not charged. Likewise, when switch 812 is closed, the direct current produced by rectifier 808 can be used to charge energy storage 816, and when this switch is open the energy storage 816 is not charged. Electricity consuming devices 818 and 220 can operate using direct current provided over electrical lines 815 and 817, respectively.

Switches 810 and 812 can be controlled via various mechanisms to open and close at various assigned time slices. For example, assume that electricity consuming device 818 is assigned odd time slices and electricity consuming device 820 is assigned even time slices. Under these circumstances, the sensing mechanism 804 should see a relatively even amount of power drawn in each time slice. If excess power is drawn during an odd time slice, this suggests that switch 812 is closed during the odd time slice when the switch should be open. Likewise, if excess power is drawn during an even time slice, this suggests that switch 810 is closed during the even time slice when the switch should be open.

Temporal Modulation Discussion

Temporal modulation circuit 800 can be implemented in various different ways. In some cases, the sensing mechanism 804 is collocated with or geographically close to rectifiers 806 and 808, switches 810 and 812, energy storage 814 and 816, and electricity consuming devices 818 and 820. In other cases, the sensing mechanism is geographically very distant from these devices, as discussed more below. The following discussion explains this with reference to how the various components of temporal modulation circuit 800 shown in FIG. 8 can be integrated into the grid hierarchy 400 shown in FIG. 4.

In one implementation, the entire temporal modulation circuit 800 is located downstream of the local transformer. For example, transformer 414 can output 60 Hz power and serve as AC power source 802. The sensing mechanism 804 can be collocated between the transformer and the connected power consumers. In this configuration, each premises connected to the transformer can have corresponding rectifiers, switches, energy storage, and electricity consuming devices.

For example, consider a single household with a refrigerator 430 and a range 432. The range may be configured to operate on even time slices and the refrigerator may be configured to operate on odd time slices. Now, assume that grid conditions become unstable and outages are likely. To prevent the outages, the power management system 310 may instruct devices drawing power from even time slices to stop drawing power, while continuing to allow devices drawing power from odd time slices to do so. This can reduce the load on the grid and potentially prevent an outage. In a similar manner, a high priority consumer such as a hospital might be assigned a first series of time slices and "regular" consumers assigned a second series of time slices. In the event the grid is stressed, the "regular" consumers may be instructed to reduce consumption while continuing to provide full power to the hospital. Likewise, different neighborhoods, cities, states, etc., can also be organized on a time slice basis, e.g., certain time slices for one neighborhood and other time slices for another neighborhood.

Like the aforementioned frequency modulation circuit 500, the temporal modulation circuit 800 can be spread across different levels of the grid hierarchy. For example, the sensing mechanism 804 can be collocated with the power generation facility 110. Under these circumstances, the sensing mechanism can evaluate how power is drawn by a multitude of different grid devices to determine whether any devices are drawing power during unassigned time slices. Alternatively, the sensing mechanism can be located at an individual substation or transformer to detect power usage downstream of that particular piece of electrical equipment.

Note that the temporal modulation examples presented herein can also use a significant amount of existing infrastructure that can be reused. Indeed, in some implementations, there is no additional modulation performed on the supply side (e.g., power generation). Rather, electricity is modulated by the individual consumption devices drawing power during their assigned time cycles.

Temporal Modulation Providing Method

The temporal modulation circuit 800 shown in FIG. 8 is one example of a circuit that can be used to implement a temporal modulation providing method 900, shown in FIG. 9. Like method 600 discussed above with respect to FIG. 6, method 900 can be performed in association with providing or generating electrical power, and can be performed by an electrical utility, grid operator, etc. However, the method can also be performed by other entities and in various contexts, e.g., within a single device, within a home, within a neighborhood, over large geographic regions, etc.

Method 900 begins at block 902, where time slices are assigned to different electrical devices. In the example discussed above, odd and even numbered time slices were used for the purposes of exposition. In some cases, different orthogonal codes can be assigned to individual power consumers for reasons discussed more below. Each code can identify a set of time slices assigned to a given electricity consumer, and a corresponding other set of time sequences during which the power consumer is not permitted to draw power.

Method 900 continues at block 904, where power is delivered to multiple different electricity consumers. Generally, the power can be delivered as alternating current without any temporal modulation on the power generation side, for reasons discussed more below.

Method 900 continues at block 906, where usage of the power is analyzed. For example, assume electricity consuming devices 818 and 820 in FIG. 8 are permitted to draw equal amounts of power, with device 818 drawing in odd time slices and device 820 drawing in even time slices. As previously noted, if both devices draw during a given time slice, the sensing mechanism 804 can detect that an unauthorized device has drawn power during that time slice.

Method 900 continues at block 908, which causes an adjustment to usage of the electricity. For example, an instruction can be sent to adjust the power consumption of a given electricity consumer. Generally speaking, block 908 of method 900 can be similar to block 608 of method 600. For example, the power consumption by electricity consuming device 818 can be adjusted by sending an instruction to reduce, stop, or increase the amount of power drawn by this electricity consuming device. In some cases, the instructions are sent directly to the electricity consuming device, and in other cases can be sent to another device in the circuit such as switch 810 or to a local computing device that controls power usage by the electricity consuming device. In some cases, the instruction is sent over a computer network, and in other cases power line communication techniques are used to send the instruction over one or more of the electrical lines.

When using temporal modulation, one way to instruct an electricity consuming device to reduce its power consumption is to change the time slices assigned to that device. For example, a given device may be drawing, on average, every third time slice and the device (or associated switch or other piece of electrical hardware) may be instructed to reduce its consumption to every fourth time slice. In some cases, the instruction can be a binary code, e.g., 1100 can be interpreted as an instruction to draw power in time slices 0 and 1 and not to draw power in time slices 2 and 3.

Temporal Modulation Consumption Method

The temporal modulation circuit 800 shown in FIG. 8 is also an example of a circuit that can be used to implement a temporal modulation consumption method 1000, shown in FIG. 10. Like method 700 discussed above with respect to FIG. 7, method 1000 can be performed in association with consuming electrical power, and can be performed by an electricity consuming device or by electrical equipment that shares a circuit with the electricity consuming device. In some cases, the method is performed by electrical equipment provided by a utility or grid operator (e.g., on the user premises or elsewhere in the grid) although other implementations are also contemplated and discussed further herein.

Method 1000 begins at block 1002, where a time slice assignment is received by a given electricity consumer. As noted above, the time slice assignment may be represented as a binary string identifying which time slices the power consumer is permitted to draw power from. As also noted, in some cases the time slice assignments may conform to a coding scheme usable to detect unauthorized power draw during a given power slice.

Method 1000 continues at block 1004, where power is selectively drawn during the assigned time slices but not other time slices. For example, switch 810 can be closed during time slices assigned to electricity consuming device 818 and otherwise open.

Method 1000 continues at block 1006, where the electricity consumer is powered. In some cases, the power drawn at block 1004 is used to charge an energy storage device and block 1006 involves drawing power from the energy storage device.

Method 1000 continues at block 1008, where consumption is adjusted based on a received instruction. For example, the instruction can be to reduce, halt, or increase consumption of electrical power. In some cases, the instruction is received by the electrical device being powered (e.g., electricity consuming device 818), and in other cases, can be received by another device such as switch 810. In some cases, the instruction identifies a new time slice pattern or code to be used by the consuming device.

Generally, method 1000 can serve as a counterpart to method 900. For example, assume electricity consuming device 818 (FIG. 8) is critically important, e.g., a piece of hospital equipment. Assume electricity consuming device 820 is less critical, e.g., a television. Under conditions when electrical resources are strained, e.g., due to excessive demand, weather conditions that limit renewable energy generation (e.g., cloud cover), instructions can be sent to reduce or disable electricity consuming device 820 while allowing electricity consuming device 818 to continue drawing full power.

Example Time Slice Analysis

Figure 11:
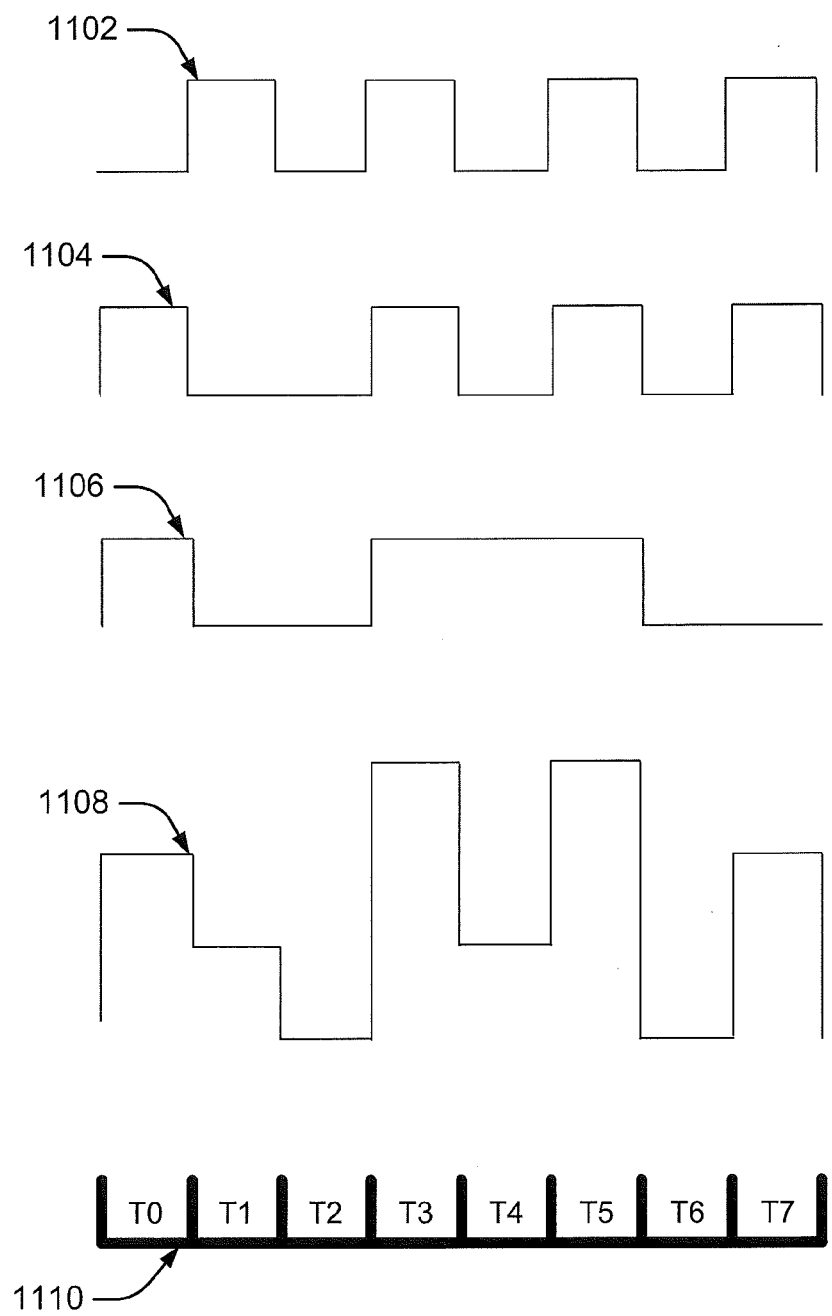
FIGS. 11 and 12 illustrate example temporal modulation characteristics of electricity consistent with some implementations of the present concepts.
Figure 12:
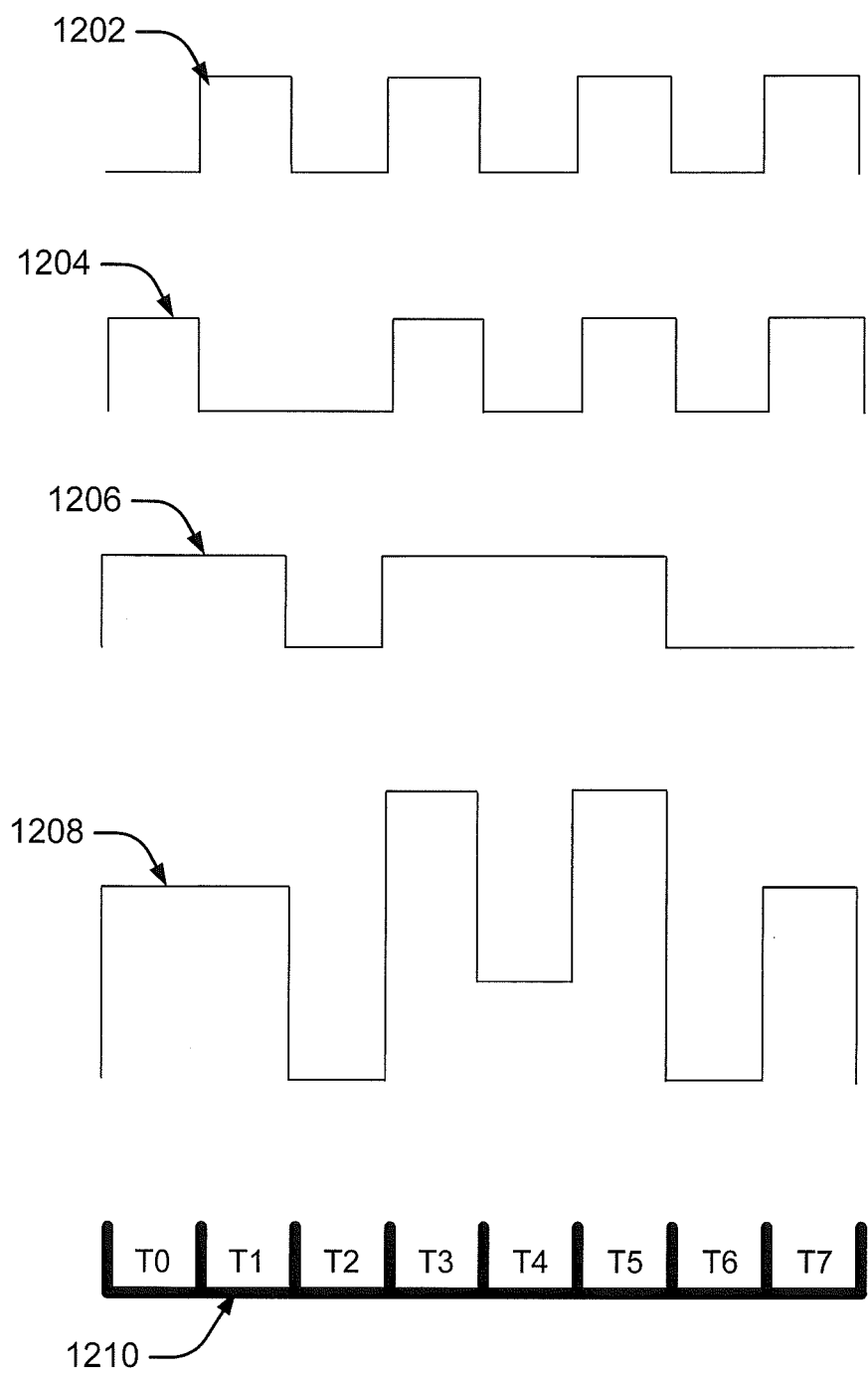

FIGS. 11 and 12 further illustrate how the power management system 310 can infer unauthorized usage of power using assigned time slices. Generally speaking, FIG. 11 illustrates a scenario where three electricity consuming devices obtain power only during authorized time slices, and FIG. 12 illustrates another scenario where one of the electricity consuming devices obtains power during an unauthorized time slice.

FIG. 11 shows a first power consumption pattern 1102, second power consumption pattern 1104, third power consumption pattern 1106, cumulative power consumption pattern 1108, and timeline 1110. Timeline 1110 is shown for reference purposes and shows 8 time slices numbered T0 through T7. First power consumption pattern 1102 shows power consumption during these 8 time slices by a first electricity consuming device, second power consumption pattern 1104 shows power consumption during these 8 time slices by a second electricity consuming device, and third power consumption pattern 1106 shows power consumption during these 8 time slices by a third electricity consuming device. Cumulative power consumption pattern 1108 shows a sum of the power consumption from patterns 1102, 1104, and 1106 in each time slice.

Assume that patterns 1102, 1104, and 1106 each represent authorized consumption patterns. Thus, the first power consumption pattern 1102 shows a first device correctly drawing power during time slices T1, T3, T5, and T7 assigned to the first device. The second power consumption pattern 1104 shows a second device correctly drawing power during time slices T0, T3, T5, and T7 assigned to the second device. The third power consumption pattern 1106 shows a third device correctly drawing power during time slices T0, T3, T4, and T5 assigned to the third device.

The sensing mechanism 804 shown in FIG. 8 can sense cumulative power draw patterns such as 1108 on the time slice circuit and provide this data to the power management system 310. The power management system 310 can analyze the cumulative power draw pattern and determine that the cumulative power draw pattern does not show any unauthorized power usage.

Now, consider FIG. 12, which includes patterns 1202, 1204, 1206, and 1208 similar to those in FIG. 11. However, note that in FIG. 12, consumption pattern 1206 shows that the third device has drawn power during time slice T1, which is not assigned to this device. As a consequence, cumulate power draw pattern 1208 shows two power units being drawn in time slice T1 when only the first device is authorized to draw power. When cumulate draw pattern 1208 is provided by the sensing mechanism 804 to the power management system 310, the power management system 310 can detect that at least one of the second or third devices has drawn power during an unauthorized time slice.

Note that more complex time patterns can be involved and thus FIGS. 11 and 12 are merely exemplary. In some implementations, many orthogonal codes are generated representing different time slice patterns, and these patterns are assigned to different devices. Coding theory (e.g., correlation analysis) can be performed by analyzing cumulative power draw patterns given the known codes that have been assigned to determine whether any unauthorized usage has occurred. Note that some implementations may be able to detect which specific device has improperly drawn during an unassigned cycle using coding theory, whereas other implementations may simply detect unauthorized usage but take further investigative steps to actually identify which device is drawing unauthorized power.

Also, some implementations may also perform temporal modulation on the generation side. For example, the power management system 310 may control electrical equipment to manipulate the amount of power placed on the grid during each time slice, e.g., based on a sum of the amount of power expected to be used by each device for each assigned time slice. However, because power draw patterns are sufficient to reveal which time slices are used by which devices, the power generation side does not need to manipulate power generation to detect misuse.

Instruction Schemes

In some implementations, the power management system 310 can perform dynamic reconfiguration of electrical equipment by sending instructions over network 320 to the electrical equipment. As previously noted, network 320 can be implemented using traditional wired or wireless computing networks and/or power line communication techniques. For example, power management system 310 could send an instruction to switch 360 over an electrical connection, a wired computer networking connection, a wireless computer networking combination, or a combination thereof.

In some cases, trusted and/or tamper-proof equipment can be deployed along a circuit that provides power to a given electrical consumer. For example, a trusted switch can be deployed at a residence and configured to turn on or off based on instructions received from the power management system 310. In frequency modulation schemes, the power management system might instruct switches connected to 50 Hz equipment to open while leaving switches connected to 60 Hz equipment closed. In temporal modulation schemes, the power management system might instruct some devices (e.g., at server installation 130) to reduce the charging rate of their batteries by drawing from fewer time slices (e.g., from drawing on 33% of time slices to 20% of time slices) while allowing other devices (e.g., at a hospital or consumer residence) to continue drawing at the same rate.

In some cases, individual devices can have assigned identifiers (e.g., addresses) that are sent over the network 320. In the case of power line communication, coding techniques can be applied to the electrical current so that the electrical current carries the instructions and/or identifiers thereon. In some cases, units of electrical energy can be "packetized" on the grid 120 by designating certain units of electrical energy for certain consuming devices. For example, a first packet could authorize three devices to implement the current drawing patterns shown in FIG. 11 for a first 8 time slices, and then a second packet could authorize the three devices to implement the current drawing patterns shown in FIG. 12. In other words, two consecutive packets could authorize otherwise-identical drawing patterns but authorize an additional time slice (T1) in the second packet. More generally, each packet identifies a specific quantity of energy that each device is allowed to draw over two separate intervals of 8 time slices each. Note that, in some cases, each device has an associated trusted switch or other device that charges energy storage during the assigned time slices, and in other cases the device consuming the power has direct control over its own power consumption.

Further implementations may use secret keys or other secure approaches to provide power to individual devices. For example, each device can be assigned a unique secret key that either directly corresponds to, or can be used to derive, a corresponding pattern for drawing energy. The device can send a request to the power management system 310 to consume power, and the power management system can validate the request. For example, the request might have a digital signature generated using the secret key for that device.

The power management system 310 can send the device an encrypted response that identifies a specific pattern of time slices from which the device is permitted to draw power. The power management system can then evaluate cumulative power draw patterns to determine whether the requesting device is using the correct time slots. If not, this suggests that the requesting device does not have a valid secret key. In some cases, the power management system may allocate one pattern slice at a time. Thus, if 10 devices already allocated power have a correct cumulative pattern and an 11th device is then allocated power, it is likely that incorrect cumulate patterns produced thereafter are a result of the 11$^{th}$ device not having the correct key.

Capping Using Modulated Electricity

In some cases, energy and/or power capping can be implemented by circuit protection techniques, such as circuit breakers, fuses, and/or disabling electrical equipment such as generators, transformers, etc. For example, in frequency modulation implementations, 50 Hz equipment can be provided with circuit protection equipment that causes the 50 Hz equipment to stop drawing power when 50 Hz power is overloaded, e.g., if the demand for 50 Hz power is causing power factor, voltage, or frequency to fall outside of specified boundaries. Because disabling the equipment reduces the draw of 50 Hz power, this can effectively provide a form of energy and/or power capping in these implementations. Circuit protection equipment can also provide for energy and/or power capping in temporal modulation implementations as well.

In both frequency modulation and temporal modulation implementations, power capping can also be performed by the power management system 310 instructing various devices to reduce the amount of power drawn at specified frequencies or time slices. As noted above, equipment drawing at a specific frequency can be instructed to reduce or cease power usage when availability of energy at that specific frequency is constrained. Likewise, individual devices can be reconfigured to use different time slices or turned off completely.

Design Alternatives

Note that this document introduces concepts that can be employed in a wide variety of configurations. As one example, some implementations may provide a dual-frequency capable device that can operate on multiple different frequencies. Referring back to FIG. 5, electricity consuming devices 518 and 520 can be replaced in the circuit 500 with a single electricity consuming device that receives power from either switch 510 and 512, perhaps by including the switches and filters 514 and 516 in the electricity consuming device itself. Such an electricity consuming device may have associated processing capability to use the different frequencies at different times, e.g., responsive to instructions from the power management system 310, based on different costs for electricity on the different frequencies, etc. Such an electricity consuming device can also include a frequency sensing circuit (e.g., an integrated circuit) that senses available frequencies on a single electrical line and selectively draws from individual frequencies at different times based on the instructions. In further implementations, such an electricity consuming device can have an array of filters, rectifiers, and/or frequency sensing circuits and be able to draw power from many more frequencies (e.g., 100 frequencies each having an associated switch and filter). In some cases, the device can be instructed to draw specific percentages of power from different frequencies, e.g., draw 10% of its power from 50 Hz, 60% from 60 Hz, and 30% from 70 Hz. These percentages can change over time depending on how the power management system determines to allocate power consumption.

As another example, some implementations may combine frequency and temporal modulation on a single wire. A dual-frequency capable electricity consuming device could be assigned a first series of time slices on a first frequency and a second series of time slices on a second frequency. Energy storage could be charged by either frequency, thus enabling the device to operate regardless of which frequency is used to charge the storage. This could be useful during times when renewable energy is scarce to reduce the usage of green energy at 50 Hz by assigning fewer time slices to individual devices for charging the energy storage and adding additional time slices of brown energy. The net power consumption by the device would not necessarily change, but this still provides the power management system 310 with the ability to manage how the different sources of power are utilized by sending the device instructions to use specific time slices to draw specific frequencies.

Note that a single device could also have two time slice circuits that are both powered using the same frequency. For example, a first rectifier and switch could charge a battery during a first series of time slices and a second rectifier and switch could charge the battery during a second series of time slices. For example, the first set of time slices could represent green energy and the second set could represent brown energy, or energy from different sources, different prices, etc. The power management system 310 could instruct the first switch to draw during a different set of time slices than the second switch.

Also, note that the aforementioned discussion focuses on DC energy storage, such as batteries, in the time slice implementations. However, alternating current energy storage, such as flywheels, can also be used consistent with the disclosed implementations. Furthermore, energy storage can also be used with frequency modulation examples. For example, assume 50 Hz green power tends to be available intermittently and 60 Hz brown power tends to be almost always available. A device configured to run on 60 Hz could run directly on brown power. The 50 Hz green power, when available, could be used to charge an energy storage device connected to an inverter that produces 60 Hz current. Thus, the device could still be powered by green power when the green power is not directly available and only switch to brown power when the energy storage is discharged completely.

Also, note that different frequencies and time slices can be used to distinguish between electricity consumers or sources for many different reasons. In some implementations, a given entity might provide an energy rebate for energy used from a specific source, e.g., a given utility might generate electricity at a specific frequency and incentivize users to use that specific frequency. Alternatively, energy from that utility could be transmitted over a large region in specific time slices and the utility could provide incentives for users to use the energy in those specific time slices.

Computing Hardware Implementations

Referring back to FIG. 3, environment 300 as shown includes several components. In this case, for purposes of explanation, the components are characterized as a power management system 310, client device 330, power consumers 130, 140, 150, and 160, and electrical hardware 110, 340, 350, and 360. In this example, the power management system can be manifest as a server computing device, desktop, tablet, laptop device, etc. Generally, so long as a device has some computational hardware, the device can act as the power management system or client device in accordance with the disclosed implementations. Likewise, so long as a device has some computational hardware, the device can implement the power management control module 316 and/or power management action module 318 described herein. Of course not all device implementations can be illustrated and other device implementations should be apparent to the skilled artisan from the description above and below.

The term "device", "computer," "computing device," "client device," and or "server device" as used herein can mean any type of device that has some amount of hardware processing capability (e.g., processing resources 312) and/or hardware storage/memory capability (e.g., memory/storage resources 314). Processing capability can be provided by one or more processors (e.g., hardware processing units/cores) that can execute computer-readable instructions to provide functionality. Computer-readable instructions and/or data can be stored on storage, such as storage/memory and or a data store.

The storage/memory can be internal or external to the device. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose processor and storage/memory. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality.

In addition, some implementations may use dedicated logic circuits such as application-specific integrated circuits ("ASICs") or field-programmable gate arrays ("FPGAs"). In particular, electrical hardware can be configured with such dedicated logic circuits to act as the power management action module 318 and respond to instructions from the power management system 310. Thus, the term "processor" as used herein can also refer to central processing units (CPUs), graphical processing units (CPUs), controllers, microcontrollers, processor cores, dedicated logic circuits, or other types of processing devices suitable for implementation in conventional computing architectures as well as SOC designs.

In some configurations, the power management module 316 and power management action module 318 can be installed as hardware, firmware, or software during manufacture of the device or by an intermediary that prepares the device for sale to the end user. In other instances, the end user may install the power management module later, such as by downloading executable code and installing the executable code on the corresponding device.

Also note that devices generally can have input and/or output functionality. For example, computing devices can have various input mechanisms such as keyboards, mice, touchpads, voice recognition, etc. Devices can also have various output mechanisms such as printers, monitors, etc.

Also note that the devices described herein can function in a stand-alone or cooperative manner to implement the described techniques. For example, each of the methods described herein can be performed on a single computing device and/or distributed across multiple computing devices that communicate over network(s) 320. Without limitation, network(s) 320 can include one or more local area networks (LANs), wide area networks (WANs), the Internet, and the like.

Further Examples

The various examples disclosed herein can include a first method example. The first method example can include modulating electricity to obtain modulated electricity having at least two different alternating current frequencies including a first alternating current frequency and a second alternating current frequency and delivering the modulated electricity having the at least two different alternating current frequencies to multiple different electrical devices, including a first electrical device configured to utilize the first alternating current frequency and a second electrical device configured to utilize the second alternating current frequency. The modulated electricity having the at least two different alternating current frequencies can be delivered at least partly over an electrical line shared by the first electrical device and the second electrical device. In a second method example, the first method example includes capping energy usage of the first alternating current frequency differently than the second alternating current frequency. In a third method example, the first method example or the second method example can include sending an instruction to cause the first electrical device to stop drawing power using the first alternating current frequency while allowing the second electrical device to continue drawing power using the second alternating current frequency. In a fourth method example, the third method example can include transmitting a code representing the instruction over the electrical line. In a fifth method example, the code of the fourth method example is configured to be readable by a switch collocated with the first electrical device.

The various examples disclosed herein can also include a first system example. The first system example can include a filter configured to receive modulated electricity having at least two different alternating current frequencies over an electrical line. The at least two different alternating current frequencies can include a first alternating current frequency and a second alternating current frequency. The filter can also be configured to attenuate the second alternating current frequency of the modulated electricity to obtain filtered modulated electricity that is predominantly of the first alternating current frequency. The first system example can also include an electricity consuming device configured to operate on the filtered modulated electricity. In a second system example, the first system example can include a second filter configured to receive the modulated electricity having the at least two different alternating current frequencies over the electrical line, and attenuate the first alternating current frequency of the modulated electricity to obtain second filtered modulated electricity that is predominantly of the second alternating current frequency. The second system example can also include a second electrical device configured to operate on the second filtered modulated electricity. In a third system example, the first or second system example can include a switch and a processor configured to receive an instruction to stop drawing power at the first alternating current frequency and stop the first electrical device from drawing power at the first alternating current frequency while the second electrical device continues to draw power at the second alternating current frequency. In a fourth system example, the instruction of the third system example can be received over a computer network or over an electrical line carrying both the first alternating current frequency and a second alternating current frequency. In a fifth system example, the first through fourth system examples can include a meter configured to meter energy consumption at the first alternating current frequency separately from energy consumption at the second alternating current frequency.

The various examples disclosed herein can include a first additional method example. The first additional method example can include delivering electricity to a plurality of electrical devices having assigned time slices for drawing the electricity analyzing usage of the electricity to detect that an individual electrical device has drawn electricity during an individual time slice that is not assigned to the individual electrical device. In a second additional method example, the analyzing the usage of the electricity of first additional method example includes evaluating power drawn by the plurality of electrical devices. In a third additional method example, the first additional method example or second additional method example includes comprising assigning the time slices as different codes of a coding scheme. In a fourth additional method example, the third additional method example includes using correlation analysis of the different codes to identify the individual electric device. In a fifth additional method example, the third or fourth additional method examples include generating the electrical energy as a sum of the different codes.

The various examples disclosed herein can also include a first additional system example. The first additional system example can include electrical hardware and an electricity consuming device. The electrical hardware can be configured to selectively draw electricity during assigned time periods and power the electricity consuming device using the electricity that is selectively drawn during the assigned time periods. In a second additional system example, the first additional system example includes an energy storage device and the electrical hardware is configured to charge the energy storage device during the assigned time periods. In a third additional system example, the electrical hardware of the second additional system example includes a rectifier configured to convert the electrical energy from alternating current to direct current to charge the energy storage device. In a fourth additional system example, the first through third additional system examples include a processor configured to receive the assigned time periods over a computer network or over an electrical line that carries the electricity. In a fifth additional system example, the electrical hardware of the fourth additional system example includes a switch and the processor is configured to control the switch to present high resistance during unassigned time periods and low resistance during the assigned time periods.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A system comprising:
   a filter configured to:
      receive modulated electricity having at least two different alternating current frequencies over an electrical line, the at least two different alternating current frequencies including a first alternating current frequency and a second alternating current frequency, and
      attenuate the second alternating current frequency of the modulated electricity to obtain filtered modulated electricity that is predominantly of the first alternating current frequency; and
   a meter configured to meter energy consumption at the first alternating current frequency separately from energy consumption at the second alternating current frequency.

2. The system of claim 1, further comprising:
   a second filter configured to:
      receive the modulated electricity having the at least two different alternating current frequencies over the electrical line, and
      attenuate the first alternating current frequency of the modulated electricity to obtain second filtered modulated electricity that is predominantly of the second alternating current frequency;
   a first electrical device configured to operate on the filtered modulated electricity; and
   a second electrical device configured to operate on the second filtered modulated electricity.

3. The system of claim 2, further comprising:
   a switch; and
   a processor configured to:
      receive an instruction to stop drawing power at the first alternating current frequency; and
      control the switch to stop the first electrical device from drawing power at the first alternating current frequency while the second electrical device continues to draw power at the second alternating current frequency.

4. The system of claim 3, wherein the instruction is received over a computer network or over the electrical line.

5. The system of claim 2, further comprising:
another electrical line that carries the filtered modulated electricity to the first electrical device; and
a further electrical line that carries the second filtered modulated electricity to the second electrical device.

6. The system of claim 5, wherein the meter is deployed on the electrical line over which the modulated electricity is received.

7. The system of claim 5, wherein the meter comprises a first meter deployed on the another electrical line and a second meter deployed on the further electrical line.

8. A method comprising:
obtaining, on an electrical line, modulated electricity having at least two different alternating current frequencies including a first alternating current frequency and a second alternating current frequency;
using a filter, attenuating the second alternating current frequency of the modulated electricity to obtain filtered modulated electricity that is predominantly of the first alternating current frequency; and
using a meter, metering energy consumption at the first alternating current frequency separately from energy consumption at the second alternating current frequency.

9. The method claim 8, further comprising:
powering a first electrical device with the filtered modulated electricity that is predominantly of the first alternating current frequency.

10. The method of claim 9, further comprising:
using another filter, attenuating the first alternating current frequency of the modulated electricity to obtain second filtered modulated electricity that is predominantly of the second alternating current frequency; and
powering a second electrical device with the second filtered modulated electricity that is predominantly of the second alternating current frequency.

11. The method of claim 10, wherein the meter is placed on the electrical line and the electrical line carries the modulated electricity before the first alternating current frequency and the second alternating current frequency are attenuated.

12. The method of claim 10, further comprising:
metering the energy consumption using a first meter placed on another electrical line that carries the filtered modulated electricity and a second meter placed on a further electrical line that carries the second filtered modulated electricity.

13. The method of claim 10, further comprising:
modulating renewably-sourced energy at the first alternating current frequency;
modulating fossil fuel-sourced energy at the second alternating current frequency; and
providing the modulated electricity on the electrical line, the electrical line carrying both the renewably-sourced energy at the first alternating current frequency and the fossil fuel-sourced energy at the second alternating current frequency.

14. The method of claim 13, further comprising:
powering the first electrical device predominantly using the renewably-sourced energy, the first electrical device being powered by another electrical line carrying the filtered modulated electricity.

15. The method of claim 14, further comprising:
powering the second electrical device predominantly using the fossil fuel-sourced energy, the second electrical device being powered by a further electrical line carrying the second filtered modulated electricity.

16. The method of claim 15, further comprising:
sending an instruction over a network to control a switch, the instruction causing the switch to open and thereby prevent the second filtered modulated electricity from being provided to the second electrical device.

17. A system comprising:
an electrical line configured to carry modulated electricity having at least two different alternating current frequencies including a first alternating current frequency and a second alternating current frequency;
a meter configured to meter energy consumption at the first alternating current frequency separately from energy consumption at the second alternating current frequency; and
a switch configured to control power consumption on the first alternating current frequency.

18. The system of claim 17, further comprising:
a computing device configured to power cap the first alternating current frequency separately from the second alternating current frequency by instructing the switch to open.

19. The system of claim 18, wherein the computing device is further configured to:
detect a shortage of power for an electrical grid carrying the modulated electricity; and
instruct the switch to open responsive to detecting the shortage of power.

20. The system of claim 18, further comprising:
one or more first pieces of electrical equipment configured to draw current at the first alternating current frequency; and
one or more second pieces of electrical equipment configured to draw current at the second alternating current frequency,
the switch controlling power delivery to the one or more first pieces of electrical equipment.

21. The system of claim 20, further comprising:
a filter placed between the switch and the one or more first pieces of electrical equipment, the filter being configured to filter the modulated electricity to obtain first filtered electricity that is predominantly of the first alternating current frequency by attenuating the second alternating current frequency, the one or more first pieces of electrical equipment being powered by the first filtered electricity.

* * * * *